A. H. CARPENTER.
NUT LOCKING WASHER.
APPLICATION FILED NOV. 12, 1912.

1,207,859.

Patented Dec. 12, 1916.

INVENTOR
AMOS H. CARPENTER

BY

ATT'Y

UNITED STATES PATENT OFFICE.

AMOS H. CARPENTER, OF STOCKTON, CALIFORNIA.

NUT-LOCKING WASHER.

1,207,859. Specification of Letters Patent. Patented Dec. 12, 1916.

Application filed November 12, 1912. Serial No. 730,892.

*To all whom it may concern:*

Be it known that I, AMOS H. CARPENTER, a citizen of the United States, residing at Stockton, in the county of San Joaquin, State of California, have invented a new and useful Nut-Locking Washer; and I declare that the following is a full, clear, and exact description of the invention, which will enable others skilled in the art to which it appertains to make and use the same, reference being had to the accompanying drawings, and the letters of reference marked thereon, which form a part of this specification.

My invention relates to certain improvements in nut locking washers, and the object of my improvement is to provide a means for locking nuts on bolts at any desired place, and thereby prevent them from being shaken or jarred off the bolt by any indirect means. This I accomplish by the use of the peculiar construction, novel combination and adaptation of parts hereinafter described, and particularly pointed out in the claims hereunto annexed, reference being had to the accompanying drawings for a better comprehension thereof, in which—

Figure 1:
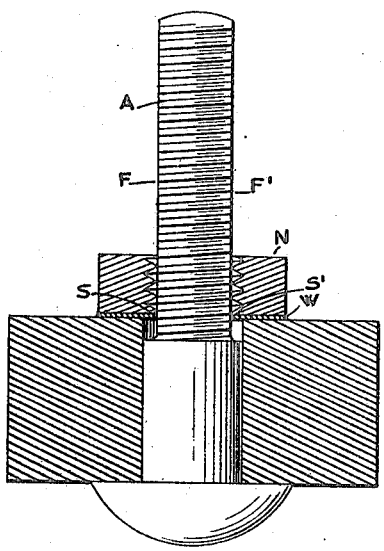
Figure 2:
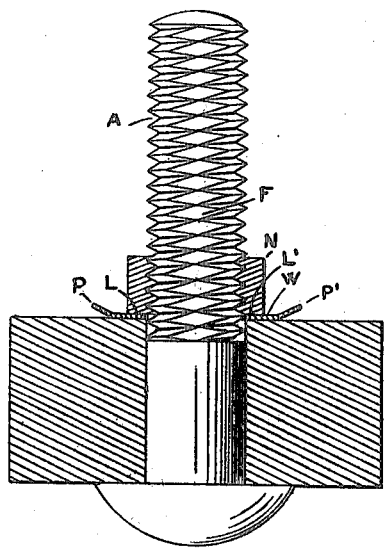
Figure 3:
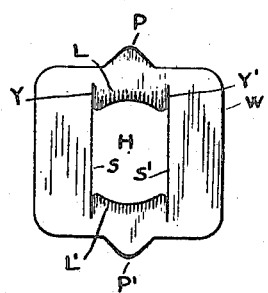
Figure 4:
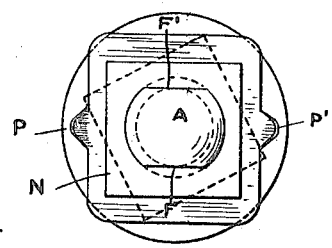
Figure 5:
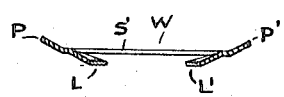

Figure 1 is a side view of a bolt, a nut and washer being shown in cross section; Fig. 2 is a similar view taken at right angles to Fig. 1; Fig. 3 is a plan view of the washer in the position shown in Fig. 1; Fig. 4 is a top plan view of the bolt, washer and nut in the position shown in Fig. 2; Fig. 5 is a cross sectional view of the washer detached.

Similar letters of reference indicate corresponding parts in the several views.

My improvement consists, essentially, of the washer W, which may be made of resilient steel, rubber or any other suitable material. The drawings show one made of resilient steel, which consists of a thin piece of that metal with straight parallel sides (although any other suitable form may be used), with tongues P and P' at opposite sides which turn slightly outward and form the oval or triangular projections on the outer or nut side of the washer, that engage the corners of the nut N when it is screwed downward upon the washer.

The bolt hole H, of the washer W, is cut out by means of the slits Y and Y' cut lengthwise in the washer of any suitable length, and form the straight sides S and S' of the bolt hole in the washer, which engage and rest upon the flat surfaces F and F' on the periphery of the bolt A, and thereby keep said washer from turning on the bolt; the oval or triangular projections P and P' on the washer engage the sides or corners of the nut, when it is screwed against the washer, and thereby prevent the nut from being shaken or jarred off the bolt by any indirect means. The material lying between said slits Y and Y' in the washer form the lips L and L' at opposite sides of the bolt hole of the washer and which project slightly inward, when not in contact with the nut, in order that the opening between the same may be enlarged and that the washer will slip loosely upon the bolt, the inner ends of said lips are made rough or corrugated along the circular portions of the lips L and L' in order to create friction when pressed against the screw threads and are made circular in form so as to fit the periphery of the bolt, and said lips are made of such length that when the nut is screwed against the washer and the lips are pressed upward to the surface level of the washer, the said rough, circular and inner edges of said lips firmly embrace the adjacent portions of the periphery of the bolt, and the washer is thereby held in position and prevented from turning on the bolt, and the projections P and P' on the washer engage the sides or corners of the nut and thereby prevent it from being shaken or jarred off the bolt.

It will be observed that the projections P and P' on the outer surface of the washer are placed at such a distance from the bolt hole as to come near or against the outer sides of the nut at those points where the distance between such sides and the periphery of the bolt hole is shortest, and that when the nut is screwed downward on the bolt the corners and more remote portions of the nut press against the said oval or triangular projections, as shown by dotted lines in Fig. 3, and force them out of its pathway, and that after said corners and portions of said nut pass said projections they spring back into position in the pathway of the nut, and prevent it from turning in any direction unless sufficient force is used to overcome the resistance of said projections and force them out of its pathway; and that the nut can only be unscrewed from the bolt by turning the same backward with sufficient force to crowd said projections out of its pathway. The dotted straight lines B in Fig. 3 show the outlines and position of the nut on the washer, and how its corners and portions of its sides engage the projections P and P', and the circular dotted lines C in the same figure represent the periphery of the bolt inside the washer before the lips are forced against its periphery.

In Fig. 4 an ordinary bolt is shown, the raised flattened sides of the bolt shank being dispensed with.

If the washer is made of rubber or any similar material the circular lips of the bolt hole firmly embrace the bolt, and when the nut is turned on against the washer the corners thereof become embedded in the rubber or other soft material, and the bulging up of that material around the corners of the nut form and constitute the projections on the washer that prevent the nut from being jarred or shaken off the bolt by any indirect means.

If the washer is made of rubber or any similar material the lips of the bolt hole will not naturally project beyond the plane of the washer as shown in Fig. 2, whereby the bolt hole is enlarged so that it can readily receive the bolt; but this end may be attained by pressing upon the ends P and P'' of the washer and forcing them outward, and then the lips will thereby project inward in the opposite direction, and thereby increase the distance between the lips, so that the washer will easily slip upon the bolt.

When a bolt of the form shown in Fig. 1 is used, the flattened portions F, it is to be understood, are raised above the curved face of the bolt shank so that the straight edges Y Y' will engage such flat portions simultaneously with the lips L and L' engaging the curved faces of the bolt.

It will be seen that the essence of my invention resides in providing a spring metal washer with means adapted to engage a bolt and prevent the washer turning on the bolt and also having one or more raised portions, two being here shown, each of which is adapted to be depressed by the inner surface of the nut when it is screwed tightly down on the bolt, and located at a less distance from the axis of the bolt than a corner of the nut and a greater distance than a side thereof so that it is depressed when the corner of the nut passes thereover, and after it has so passed it springs up and abuts against the side of the nut to prevent the nut from being unscrewed.

What I claim and desire to secure by Letters Patent, is—

1. In a nut locking washer, the combination of a bolt having an angular shank, a nut for the reception of the bolt, and a washer the opening of which has a side conformed to engage the angular shank of the bolt to prevent it moving thereon, the washer having near its outer edge a portion bent out of its plane on the side adjacent to the nut to engage a corner of the nut, and being at a greater distance from the center of the nut than the distance of the outer edge therefrom, but less than the distance of the corner of the nut therefrom.

2. The combination of a nut, a carriage bolt having an angular shank, a flexible washer on said bolt having at its inner edge opposite portions bent out of its plane on the side remote from the nut and adapted to engage the bottom of the thread of the bolt, when pressed by the nut into the plane of the washer, its bolt hole having a straight side to engage the angular shank of the bolt to prevent it turning thereon, and also having near its outer edge opposite portions projecting out of the plane of the washer on the side adjacent to the nut to engage the corners of the nut, said latter portions being at a distance from the center of the nut greater than the distance of the outer edge of the nut therefrom, but less than the distance of the corner of the nut therefrom.

AMOS H. CARPENTER.

Witnesses:
  O. L. MARES,
  R. W. DODGE.

Copies of this patent may be obtained for five cents each, by addressing the "Commissioner of Patents, Washington, D C."